(12) United States Patent
Son et al.

(10) Patent No.: US 11,312,365 B2
(45) Date of Patent: Apr. 26, 2022

(54) METHOD AND APPARATUS FOR CONTROLLING SLEEP MAINTENANCE MOTION

(71) Applicants: HYUNDAI MOTOR COMPANY, Seoul (KR); KIA MOTORS CORPORATION, Seoul (KR)

(72) Inventors: Hui Un Son, Suwon-si (KR); Sung Bae Jeon, Ansan-si (KR); Jin Kyeom Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 307 days.

(21) Appl. No.: 16/778,609

(22) Filed: Jan. 31, 2020

(65) Prior Publication Data
US 2021/0101585 A1 Apr. 8, 2021

(30) Foreign Application Priority Data
Oct. 8, 2019 (KR) .......................... 10-2019-0124583

(51) Int. Cl.
*B60W 20/40* (2016.01)
*B60L 58/12* (2019.01)
*B60W 20/30* (2016.01)
*B60W 20/11* (2016.01)

(52) U.S. Cl.
CPC ............. *B60W 20/40* (2013.01); *B60L 58/12* (2019.02); *B60W 20/11* (2016.01); *B60W 20/30* (2013.01)

(58) Field of Classification Search
CPC ...... B60W 20/40; B60W 20/11; B60W 20/30; B60L 58/12
See application file for complete search history.

(56) References Cited

U.S. PATENT DOCUMENTS

| 4,656,680 A | 4/1987 | Wilson |
| 2019/0135127 A1* | 5/2019 | Ooi ........................ H02J 7/0069 |

FOREIGN PATENT DOCUMENTS

| KR | 10-0477459 B1 | 3/2005 |
| KR | 10-1905472 B1 | 10/2018 |

OTHER PUBLICATIONS

Björn-Markus Karlsson, Sound and vibration: effects on infants' heart rate and heart rate variability during neonatal transport, Acta Paediatrica, vol. 101, pp. 148-154 (2012).

\* cited by examiner

*Primary Examiner* — Ramsey Refai
(74) *Attorney, Agent, or Firm* — Lempia Summerfield Katz LLC (57) ABSTRACT

A method of controlling a sleep maintenance motion includes: determining, by a sleep maintenance mode entry determiner, whether a vehicle enters a sleep maintenance mode; when the vehicle enters the sleep maintenance mode, calculating, by an engine target speed profile calculator, an engine target speed profile; calculating, by an engine/hybrid starter generator (HSG) target torque calculator, an engine/HSG target torque based on the calculated engine target speed profile; and controlling, by the sleep maintenance mode entry determiner, a sleep maintenance motion based on an operation of an engine/HSG.

19 Claims, 8 Drawing Sheets

METHOD AND APPARATUS FOR CONTROLLING SLEEP MAINTENANCE MOTION

CROSS-REFERENCE TO RELATED APPLICATION

This application claims priority to and the benefit of Korean Patent Application No. 10-2019-0124583, filed on Oct. 8, 2019, the entire contents of which are incorporated herein by reference.

FIELD

The present disclosure relates to a method and apparatus for controlling a sleep maintenance motion.

BACKGROUND

The statements in this section merely provide background information related to the present disclosure and may not constitute prior art.

In general, a hybrid electric vehicle (HEV) is a vehicle that uses two power sources, in most cases an engine and an electric motor. An HEV has excellent fuel efficiency and engine performance compared with a vehicle including only an internal combustion engine and is also advantageous for lowering exhaust gas, and thus has been actively developed recently.

In general, sleeping of infants who sleep while traveling may be disturbed when a vehicle stops because a frequency of vibration thereof changes. In particular, when a vehicle travels at a low speed or stops, an unpleasant sensation may result. In the case of an eco-friendly vehicle, because an engine is completely stopped, the vibration of the vehicle disappears completely, and thus there is a problem in that the sleeping state of a sleep infant is not capable of being maintained.

SUMMARY

The present disclosure provides a method and apparatus for controlling a sleep maintenance motion for maintaining sleeping of a sleeping infant by releasing an engine clutch and vibrating the vehicle at a frequency of vibration at which the infant feels comfortable when the vehicle travels at a low speed or stops.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a sleep maintenance motion includes: determining, by a sleep maintenance mode entry determiner, whether a vehicle enters a sleep maintenance mode; when the vehicle enters the sleep maintenance mode, calculating, by an engine target speed profile calculator, an engine target speed profile; calculating, by an engine/hybrid starter generator (HSG) target torque calculator, an engine/hybrid starter generator (HSG) target torque based on the calculated engine target speed profile; and controlling, by the sleep maintenance mode entry determiner, a sleep maintenance motion based on an operation of an engine/HSG.

In some forms, the determining whether the vehicle enters the sleep maintenance mode may include: determining whether the sleep maintenance mode is set; when the sleep maintenance mode is set, determining whether a speed of the vehicle is equal to or less than a threshold speed; when the speed of the vehicle is equal to or less than the threshold speed, determining whether an acceleration pedal is not manipulated; when the acceleration pedal is not manipulated, determining whether a gear lever of the vehicle is in a parking (P) stage or a neutral (N) stage; and when the gear lever is in the P or N stage, controlling the sleep maintenance motion.

In some forms, the method may further include, when the gear lever is not in the P or N stage, determining whether an engine clutch of the vehicle is released.

In some forms, the method may further include, when the engine clutch is released, controlling the sleep maintenance motion.

In some forms, the method may further include, when the engine clutch is not released, determining whether the engine clutch is capable of being released.

In some forms, the method may further include, when the engine clutch is capable of being released, releasing the engine clutch, and when the engine clutch is released, controlling the sleep maintenance motion.

In some forms, the calculating the engine target speed profile may include setting a target frequency of vibration of the vehicle, and setting an amplitude based on an inertia ratio of the vehicle and the engine.

In some forms, the calculating the engine/HSG target torque may include determining a battery state of charge (SoC) of the vehicle, and calculating the target torque of the engine/HSG based on the battery SoC.

In some forms, the calculating the engine/HSG target torque may include, when the battery SoC is in a high state, calculating the target torque to accelerate or decelerate the vehicle using the HSG only, and when the battery SoC is in a low state, calculating the target torque to accelerate the vehicle using the engine or to regeneratively decelerate the vehicle using the HSG.

According to another aspect of the present disclosure, a sleep maintenance motion control apparatus includes: a sleep maintenance mode entry determiner configured to determine whether a vehicle enters a sleep maintenance mode; an engine target speed profile calculator configured to calculate an engine target speed profile when the vehicle enters the sleep maintenance mode; and an engine/hybrid starter generator (HSG) target torque calculator configured to calculate an engine/HSG target torque based on the calculated engine target speed profile.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, examples of which are illustrated in the accompanying drawings. The suffixes "module" and "unit" of elements herein are used for convenience of description and thus can be used interchangeably and do not have any distinguishable meanings or functions.

In the description of exemplary forms, it will be understood that, when an element is referred to as being "on", "under", "before" or "after" another element, the element can be directly on the other element, or intervening elements may be present.

It will be understood that, although the terms "first", "second", "A", "B", "(a)", "(b)", etc. may be used herein to describe various elements of the present disclosure, these terms are only used to distinguish one element from another element, and the order or sequence of corresponding elements is not limited by these terms. It will be understood that when one element is referred to as being "connected to", "coupled to", or "accessing" another element, the one element may be "connected to" or "coupled to" or "access" the other element via a further element, or the one element may be directly connected to or directly access another element.

The terms "comprises", "includes", and "has" described herein should be interpreted not to exclude other elements but to further include such other elements since the corresponding elements may be included unless specifically mentioned otherwise. All terms including technical or scientific terms have the same meanings as those generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Figure 1:
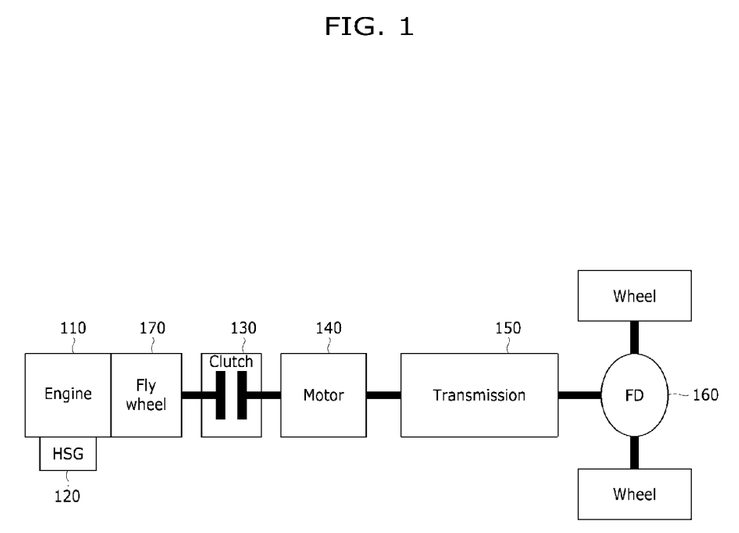
FIG. 1 is a diagram showing the configuration of a transmission mounted electric drive (TMED) hybrid vehicle according to one form of the present disclosure.

FIG. 1 is a diagram showing the configuration of a transmission mounted electric drive (TMED) hybrid vehicle according to one form of the present disclosure.

FIG. 1 shows a powertrain of a hybrid vehicle using a parallel type hybrid system in which an engine clutch 130 is installed between a motor 140 and an engine 110.

In a hybrid vehicle, in general, when a driver presses an acceleration pedal after starting the vehicle, the motor 140 is driven using the power of a battery while the engine clutch 130 is opened and then transmits power to move the wheels through a transmission 150 and a final drive (FD) 160. As the vehicle gradually accelerates, higher traction force is desired, in which case a starter generator motor 120 may be operated to drive the engine 110. The starter generator motor 120 functions as a starter motor when the engine is turned on and functions as a generator after the engine is turned on or when rotational energy is recovered while the engine is off, and thus, the starter generator motor 120 may also be referred to as a hybrid starter generator (HSG), and as necessary, may be referred to as an auxiliary motor.

Such an engine and motor may drive a vehicle via separate driving and speed control, and the vehicle is driven using the motor only at a low speed, and accordingly, the engine clutch 130 may be released to thus disconnect the engine and a wheel.

Figure 2:
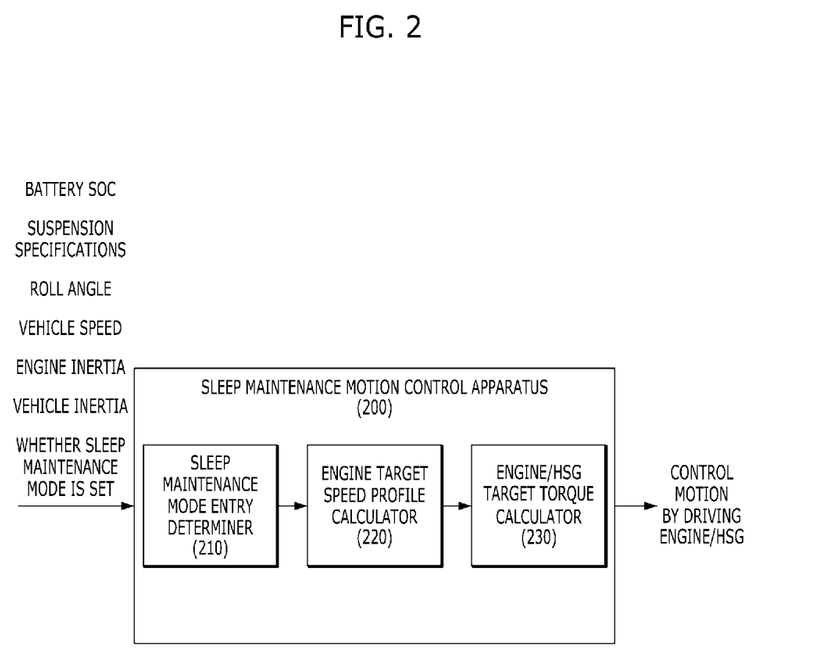
FIG. 2 is a diagram showing the configuration of an apparatus for controlling a sleep maintenance motion according to one form of the present disclosure.

FIG. 2 is a diagram showing the configuration of an apparatus for controlling a sleep maintenance motion according to one form of the present disclosure.

Referring to FIG. 2, a sleep maintenance motion control apparatus 200 may include: a sleep maintenance mode entry determiner 210, an engine target speed profile calculator 220, and an engine/HSG target torque calculator 230.

The sleep maintenance motion control apparatus 200 may receive information on a battery state of charge (SoC), suspension specifications, a roll angle, a vehicle speed, engine inertia, vehicle inertia, whether a sleep maintenance mode is set, or the like from the vehicle. Thereby, when the vehicle travels at a low speed or stops, the sleep maintenance motion control apparatus 200 may release the engine clutch 130 or may vibrate the vehicle at a preset frequency of vibration to maintain the sleeping state. Hereinbelow, components of the sleep maintenance motion control apparatus 200 will be described in detail.

First, the sleep maintenance mode entry determiner 210 may determine information on whether the sleep maintenance mode is set. In some forms, the sleep maintenance mode may be set through a user setting menu (USM) of a cluster, may be set by manipulating a separate switch when such a switch to be manipulated by a driver is installed, may be set through a speech command of a driver when a microphone for receiving such a speech command is installed, or may be automatically set by detecting the installation of a car seat in standard equipment (ISOFIX) for fixing a car seat to a vehicle, but the present disclosure is not limited thereto.

The sleep maintenance mode entry determiner 210 may determine whether a speed of the vehicle is equal to or less than a threshold speed. In some forms, when a speed for driving a vehicle in an electric vehicle (EV) mode is equal to or less than 30 kph, the threshold speed of the vehicle may be set to 30 kph or less, or when a creeping speed of the vehicle is 10 kph, the threshold speed may be set to 10 kph, but the present disclosure is not limited thereto.

The sleep maintenance mode entry determiner 210 may determine whether an acceleration pedal is manipulated. In some forms, when the acceleration pedal is not manipulated, the vehicle may begin to coast/brake/stop, and the vehicle may immediately accelerate during coasting, and thus the vehicle may enter the sleep maintenance mode while braking/stopped.

The sleep maintenance mode entry determiner 210 may determine whether a gear lever of the vehicle is in a parking (P) stage or in a neutral (N) stage. In some forms, when the gear lever of the vehicle is not in the P or N stage, the transmission of the vehicle is in a disengaged state, and thus it may be possible to control the sleep maintenance motion using the engine/HSG 110/120 in the state in which the engine clutch 130 is engaged, and accordingly, the vehicle may enter the sleep maintenance mode.

When the gear lever is in stage P/N, the engine/HSG 110/120 may be deliberately vibrated to vibrate the vehicle in order to control the sleep maintenance motion, and accordingly, the sleep maintenance mode entry determiner 210 may determine whether the engine clutch 130 is released.

When the engine clutch 130 of the vehicle is released, the sleep maintenance mode entry determiner 210 may enter the sleep maintenance mode.

When the engine clutch 130 of the vehicle is not released, the sleep maintenance mode entry determiner 210 may determine whether the engine clutch 130 of the vehicle is capable of being released.

When the engine clutch 130 of the vehicle is capable of being released, the sleep maintenance mode entry determiner 210 may perform control to release the engine clutch 130.

In some forms, when the engine clutch 130 of the vehicle is not capable of being released, for example, in a situation corresponding to refill urgent/refill now in which the hydraulic pressure of the engine clutch 130 needs to increase in a driving (D) stage of the vehicle, the vehicle may be blocked from entering the sleep maintenance mode.

The engine target speed profile calculator 220 may set the frequency of vibration of an engine target speed profile to a vehicle target frequency of vibration. An amplitude based on a vehicle target frequency of vibration may be determined through an inertial ratio between the vehicle and the engine 110. In this case, the inertia of the engine 110 may include inertia of a fly wheel 170.

The engine/HSG target torque calculator 230 may calculate a target torque based on a battery SoC in response to notification of a target speed of the engine target speed profile calculator 220.

In some forms, when the battery SoC is normal, the engine/HSG target torque calculator 230 may control the engine to be driven at an optimal point with the highest efficiency. In this case, the HSG 120 may be controlled to be driven when a torque requirement for control of vehicle speed is greater than the optimal point, and may be controlled to be regenerated when the torque requirement is less than the optimal point.

The case in which a battery SoC is higher or lower than a normal level will be described below in more detail with reference to FIGS. 6 and 7.

FIGS. 3A to 4B are diagrams showing an operation of controlling a sleep maintenance motion using an engine according to one form of the present disclosure.

Figure 3A:
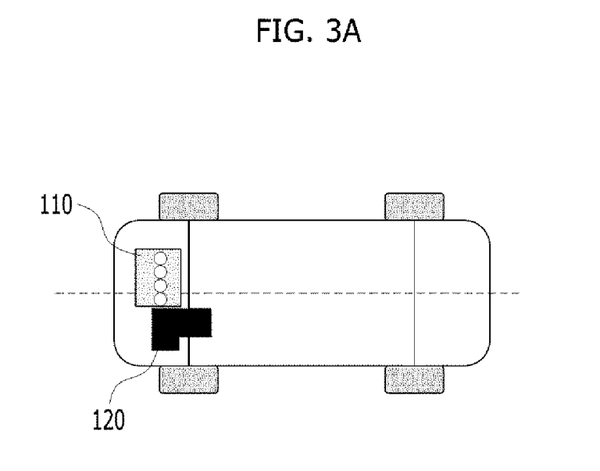
FIGS. 3A, 3B, 4A and 4B are diagrams respectively showing an operation of controlling a sleep maintenance motion using an engine according to one form of the present disclosure.
Figure 3B:
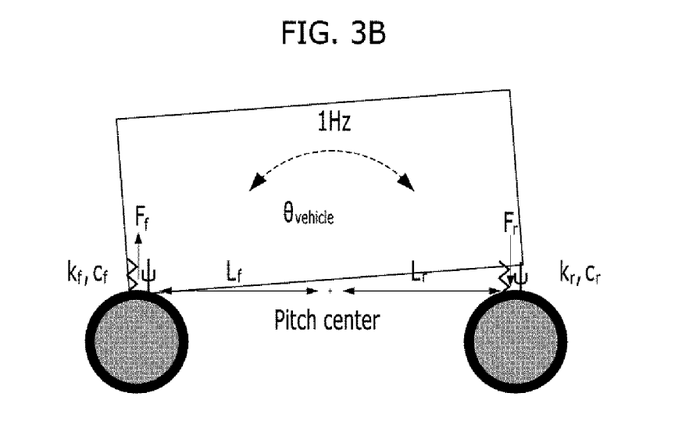

FIGS. 3A and 3B show an example of the transverse-mounted engine 110 configured by disposing the engine 110 of the vehicle in a direction perpendicular to a direction of travel of the vehicle.

In the case of the transverse-mounted engine 110, the engine 110 may be deliberately vibrated to vibrate the vehicle in forward and backward directions through a pitching motion, in which case a pitch center may be determined according to suspension design specifications.

In this case, a frequency may be synchronized with a force that is applied over time. Thus, when a speed of the engine 110 is changed to a desired frequency of vibration of the vehicle, the vehicle may be vibrated at a specific frequency.

That is, when the arrangement of the engine 110 of the vehicle corresponds to that of a transverse-mounted engine 110, the engine/HSG target torque calculator 230 may control vibration through a pitch motion, which is calculated using Equation 1 below.

$$I_{vehicle}\ddot{\theta}_{vehicle}+(c_fL_f^2+c_rL_r^2)\dot{\theta}+(k_fL_f^2+k_rL_r^2)\theta=-I_{engine}\ddot{\theta}_{engine}$$ [Equation 1]

In this case, $I_{vehicle}\ddot{\theta}_{vehicle}$ is a frequency of vibration of a vehicle, $I_{engine}\ddot{\theta}_{engine}$ is a frequency of vibration of the engine 110, $C_f$ is a damping coefficient of a front wheel suspension, $C_r$ is a damping coefficient of a rear wheel suspension, $K_f$ is a spring constant of the front wheel suspension, $K_r$ is a spring constant of the rear wheel suspension, $L_f$ is a distance between a front wheel and a pitch center, and $L_r$ is a distance between a rear wheel and the pitch center.

Figure 4A:
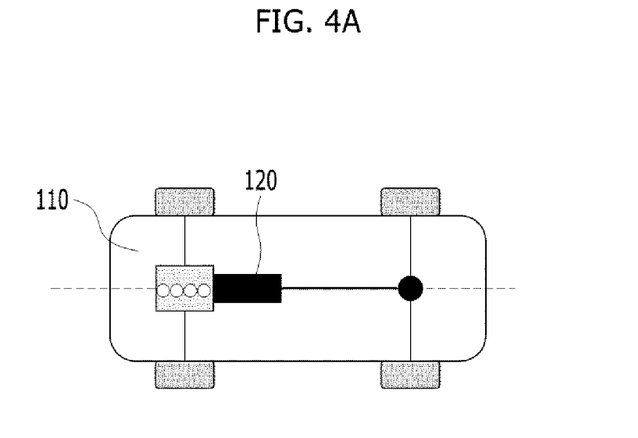
Figure 4B:
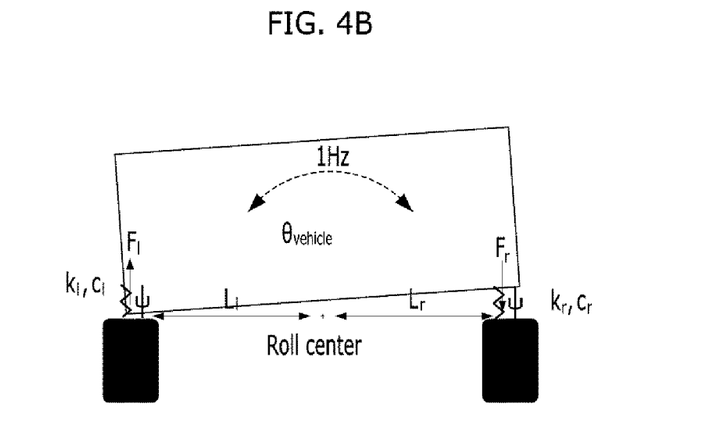

FIGS. 4A and 4B show an example of the longitudinally mounted engine 110 configured by disposing the engine 110 of the vehicle in a direction parallel to a direction of travel of the vehicle.

In the case of the longitudinally mounted engine 110, the engine 110 may be deliberately vibrated to vibrate the vehicle through a rolling motion, in which case a roll center may be determined according to suspension design specifications.

In this case, a frequency may be synchronized with a force that is applied over time. Thus, when the speed of the engine 110 is changed to a desired frequency of vibration of the vehicle, the vehicle may be vibrated at a specific frequency.

That is, when the arrangement of the engine 110 of the vehicle corresponds to that of a longitudinally mounted engine 110, the engine/HSG target torque calculator 230 may control vibration through a roll motion, which is calculated using Equation 2 below.

$$I_{vehicle}\ddot{\theta}_{vehicle}+(c_lL_l^2+c_rL_r^2)\dot{\theta}+(k_lL_l^2+k_rL_r^2)\theta=-I_{engine}\ddot{\theta}_{engine}$$ [Equation 2]

In this case, $I_{vehicle}\ddot{\theta}_{vehicle}$ is a frequency of vibration of a vehicle, $I_{engine}\ddot{\theta}_{engine}$ is a frequency of vibration of the engine 110, $C_l$ is a damping coefficient of a left wheel suspension, $C_r$ is a damping coefficient of a right wheel suspension, $K_l$ is a spring constant of the left wheel suspension, $K_r$ is a spring constant of the right wheel suspension, $L_l$ is a distance between a left wheel and a roll center, and $L_r$ is a distance between a right wheel and the roll center.

Figure 5:
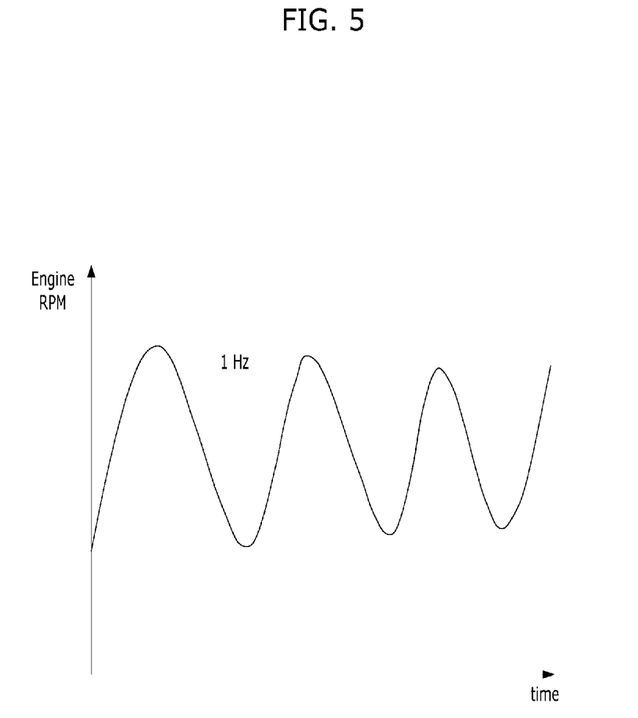
FIG. 5 is a diagram for explaining setting of a target frequency of vibration according to one form of the present disclosure.

FIG. 5 is a diagram for explaining setting of a target frequency of vibration according to one form of the present disclosure.

In the graph shown in FIG. 5, the horizontal axis indicates time and the vertical axis indicates a number of revolutions per minute (RPM) of the engine 110. The sleep maintenance motion control apparatus 200 may calculate an engine target speed profile. The engine target speed profile may be set to a vehicle target frequency of vibration.

In this case, when external force is not present in the engine 110, the angular momentum of the vehicle target frequency of vibration may be maintained, and may not be changed by internal force. Thereby, the engine 110 may rotate an inertial body to adjust the direction thereof according to the law of conservation of angular momentum. Accordingly, when the vehicle has an engine 110, the vehicle may vibrate.

The sleep maintenance motion control apparatus 200 may control the engine 110 to vibrate the vehicle at 1 Hz. That is, the sleep maintenance motion control apparatus 200 may change the RPM of the engine 110 to deliberately vibrate the engine 110 deliberately, and thereby, may perform control to vibrate the vehicle at 1 Hz. In this case, 1 Hz as set forth above may be a value that is set assuming that vibration of the ground is 60 Hz at a vehicle speed of 60 kph.

Figure 6:
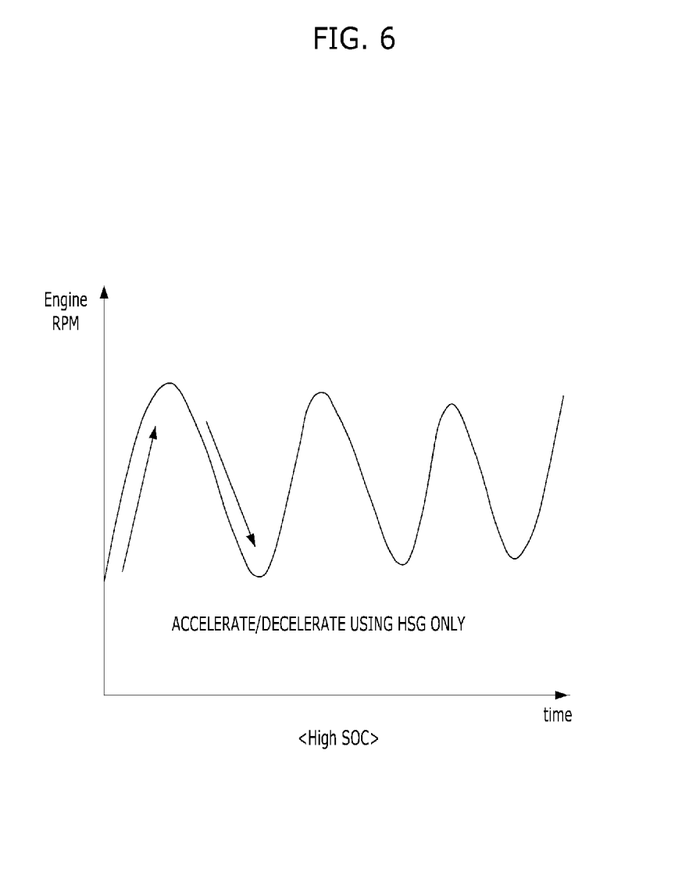
FIGS. 6 to 7 are diagrams for explaining calculation of engine/HSG target torque according to one form of the present disclosure.
Figure 7:
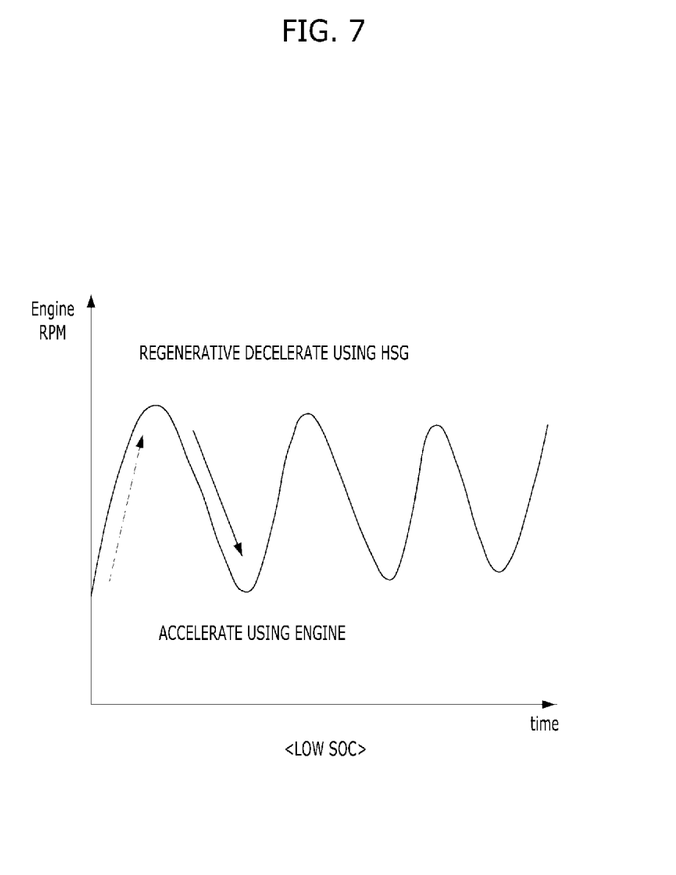

FIGS. 6 to 7 are diagrams for explaining calculation of engine/HSG target torque according to one form of the present disclosure.

In graphs shown in FIGS. 6 to 7, the horizontal axis indicates time and the vertical axis indicates the RPM of the engine 110.

As shown in FIG. 6, when a battery SoC of the vehicle is a high SoC, the sleep maintenance motion control apparatus 200 may accelerate and decelerate the vehicle using the HSG 120 only.

That is, the sleep maintenance motion control apparatus 200 may control the RPM of the engine 110 using the HSG 120 only in order to maintain the frequency of vibration of the engine 110 of the vehicle to 1 Hz. That is, torque requirement for control of a vehicle speed may be controlled by the HSG 120.

As shown in FIG. 7, when the battery SoC of the vehicle is a low SoC, the sleep maintenance motion control apparatus 200 may perform control to accelerate the vehicle using the engine 110 and may perform control to regeneratively decelerate the vehicle using the HSG 120.

Thereby, in order to maintain the frequency of vibration of the engine 110 of the vehicle to 1 Hz, the RPM of the engine 110 may be controlled by the engine/HSG 110/120. Thus, torque requirement for control of a vehicle speed may be controlled through the engine 110. A battery SoC may be increased using a regeneration operation of the HSG 120.

Figure 8:
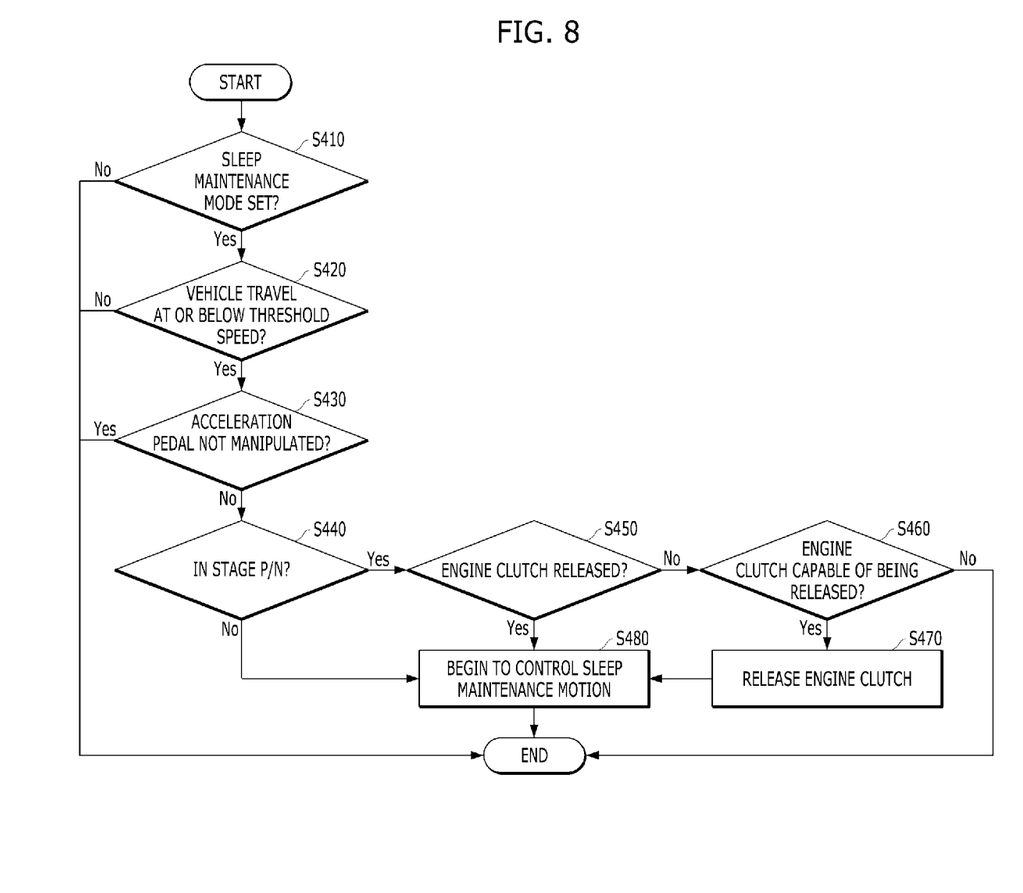
FIG. 8 is a diagram showing a method of controlling a sleep maintenance motion according to another form of the present disclosure.

FIG. 8 is a diagram showing a method of controlling a sleep maintenance motion according to one form of the present disclosure.

Referring to FIG. 8, the sleep maintenance mode entry determiner 210 may determine whether a vehicle enters a sleep maintenance mode based on information on whether the sleep maintenance mode is set (S410).

After operation S410, when the sleep maintenance mode is set (YES of S410), the sleep maintenance mode entry determiner 210 may determine whether a speed of the vehicle is equal to or less than a threshold speed based on the vehicle speed (S420).

After operation S420, when the speed of the vehicle is equal to or less than the threshold speed (YES of S420), the sleep maintenance mode entry determiner 210 may determine whether an acceleration pedal is not manipulated (S430).

After operation S430, when the acceleration pedal is not manipulated ("NO" in S430), the sleep maintenance mode entry determiner 210 may determine whether a gear lever of the vehicle is in stage P/N (S440).

After operation S440, when the gear lever is in stage P/N ("NO" in S440), a sleep maintenance apparatus may control a sleep maintenance motion (S480).

After operation S440, when the gear lever is not in stage P/N ("YES" in S440), the sleep maintenance mode entry determiner 210 may determine whether the engine clutch 130 is released (S450).

After operation S450, when the engine clutch 130 is released ("YES" in S450), the sleep maintenance apparatus may control the sleep maintenance motion (S480).

After operation S450, when the engine clutch 130 is not released ("NO" in S450), the sleep maintenance mode entry determiner 210 may determine whether the engine clutch 130 is capable of being released (S460).

After operation S460, when the engine clutch 130 is capable of being released ("YES" in S460), the sleep maintenance mode entry determiner 210 may perform control to release the engine clutch 130 of the vehicle (S470).

After operation S470, the sleep maintenance mode entry determiner 210 may control the sleep maintenance motion (S480).

The method of controlling a sleep maintenance motion according to the present disclosure may apply a system for maintaining sleep to a vehicle, and thus sleeping of infants may be maintained while a vehicle travels at a low speed or stops, and comfort of a driver and a passenger may be enhanced, thereby enhancing marketability.

An eco-friendly vehicle uses a motor other than an engine as a separate power source, and thus even if an engine clutch is released, acceleration performance may be provided when the vehicle travels at a low speed and stops.

Regenerative deceleration is performed using the HSG when an engine speed is controlled, and thus the influence on fuel efficiency of corresponding control may be reduced.

It will be appreciated by persons skilled in the art that that the effects that could be achieved with the present disclosure are not limited to what has been particularly described hereinabove and other advantages of the present disclosure will be more clearly understood from the detailed description.

The aforementioned method according to the exemplary forms may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

What is claimed is:

1. A method of controlling a sleep maintenance motion, the method comprising:
   determining, by a sleep maintenance mode entry determiner, whether a vehicle enters a sleep maintenance mode;
   when the vehicle enters the sleep maintenance mode, calculating, by an engine target speed profile calculator, an engine target speed profile;
   calculating, by an engine/hybrid starter generator (HSG) target torque calculator, an engine/HSG target torque based on the calculated engine target speed profile; and
   controlling, by the sleep maintenance mode entry determiner, a sleep maintenance motion based on an operation of an engine and an HSG.

2. The method of claim 1, wherein determining whether the vehicle enters the sleep maintenance mode includes:
   determining whether the sleep maintenance mode is set;
   when the sleep maintenance mode is set, determining whether a speed of the vehicle is equal to or less than a threshold speed;

when the speed of the vehicle is equal to or less than the threshold speed, determining whether an acceleration pedal is not manipulated;

when the acceleration pedal is not manipulated, determining whether a gear lever of the vehicle is in a parking (P) stage or a neutral (N) stage; and when the gear lever is in the P or N stage, controlling the sleep maintenance motion.

3. The method of claim 2, further comprising: when the gear lever is not in the P or N stage, determining whether an engine clutch of the vehicle is released.

4. The method of claim 3, further comprising: when the engine clutch is released, controlling the sleep maintenance motion.

5. The method of claim 3, further comprising: when the engine clutch is not released, determining whether the engine clutch is capable of being released.

6. The method of claim 5, further comprising:

when the engine clutch is capable of being released, releasing the engine clutch; and when the engine clutch is released, controlling the sleep maintenance motion.

7. The method of claim 1, wherein calculating the engine target speed profile includes:

setting a target frequency of vibration of the vehicle; and setting an amplitude based on an inertia ratio of the vehicle and the engine.

8. The method of claim 1, wherein calculating the engine/HSG target torque includes:

determining a battery state of charge (SoC) of the vehicle; and calculating the target torque of the engine/HSG based on the battery SoC.

9. The method of claim 8, wherein calculating the engine/HSG target torque includes:

when the battery SoC is in a high state, calculating the target torque to accelerate or decelerate the vehicle using the HSG only; and when the battery SoC is in a low state, calculating the target torque to accelerate the vehicle using the engine or to regeneratively decelerate the vehicle using the HSG.

10. A computer-readable recording medium configured to store a program for executing the method of claim 1.

11. A sleep maintenance motion control apparatus comprising:

a sleep maintenance mode entry determiner configured to determine whether a vehicle enters a sleep maintenance mode;

an engine target speed profile calculator configured to calculate an engine target speed profile when the vehicle enters the sleep maintenance mode; and an engine/hybrid starter generator (HSG) target torque calculator configured to calculate an engine/HSG target torque based on the calculated engine target speed profile.

12. The sleep maintenance motion control apparatus of claim 11, wherein the sleep maintenance mode entry determiner is configured to:

determine whether the sleep maintenance mode is set, determine whether a speed of the vehicle is equal to or less than a threshold speed when the sleep maintenance mode is set, determine whether an acceleration pedal is not manipulated when the speed of the vehicle is equal to or less than the threshold speed, determine whether a gear lever of the vehicle is in a parking (P) stage or in a neutral (N) stage when the acceleration pedal is not manipulated, and begin to control a sleep maintenance motion when the gear lever is in the P or N stage.

13. The sleep maintenance motion control apparatus of claim 12, wherein the sleep maintenance mode entry determiner is configured to determine whether an engine clutch of the vehicle is released when the gear lever is not in the P or N stage.

14. The sleep maintenance motion control apparatus of claim 13, wherein the sleep maintenance mode entry determiner is configured to begin to control the sleep maintenance motion when the engine clutch is released.

15. The sleep maintenance motion control apparatus of claim 13, wherein the sleep maintenance mode entry determiner is configured to determine whether the engine clutch is capable of being released when the engine clutch is not released.

16. The sleep maintenance motion control apparatus of claim 15, wherein the sleep maintenance mode entry determiner is configured to:

perform control to release the engine clutch when the engine clutch is capable of being released, and begin to control the sleep maintenance motion after the engine clutch is released.

17. The sleep maintenance motion control apparatus of claim 11, wherein the engine target speed profile calculator is configured to:

set a target frequency of vibration of the vehicle and set an amplitude based on an inertia ratio of the vehicle and the engine.

18. The sleep maintenance motion control apparatus of claim 11, wherein the engine/HSG target torque calculator is configured to:

determine a battery state of charge (SoC) of the vehicle, and calculate a target torque of the engine/HSG based on the battery SoC.

19. The sleep maintenance motion control apparatus of claim 18, wherein the engine/HSG target torque calculator calculates the target torque to accelerate and decelerate the vehicle using the HSG only when the battery SoC is in a high state, and calculates the target torque to accelerate the vehicle using the engine and to regeneratively decelerate the vehicle using the HSG when the battery SoC is in a low state.

* * * * *